United States Patent
Hirst et al.

(10) Patent No.: US 10,044,451 B2
(45) Date of Patent: Aug. 7, 2018

(54) METHOD FOR TESTING MULTIPLE WIRELESS DATA PACKET SIGNAL TRANSCEIVERS USING SHARED TESTING RESOURCES

(71) Applicant: LITEPOINT CORPORATION, Sunnyvale, CA (US)

(72) Inventors: Jonathan Barry Hirst, Sunnyvale, CA (US); Adam Martin Smith, San Ramon, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 262 days.

(21) Appl. No.: 14/187,926

(22) Filed: Feb. 24, 2014

(65) Prior Publication Data
US 2015/0244477 A1   Aug. 27, 2015

(51) Int. Cl.
*H04B 17/15* (2015.01)
*H04B 17/11* (2015.01)

(52) U.S. Cl.
CPC ............. *H04B 17/15* (2015.01); *H04B 17/11* (2015.01)

(58) Field of Classification Search
CPC ......... H04B 17/00; G96F 11/26; G07F 11/26; G01R 31/26; G01R 1/02; H04J 11/00; H04L 12/26; G04M 11/00
See application file for complete search history.

(56) References Cited

U.S. PATENT DOCUMENTS

| | | | |
|---|---|---|---|
| 6,110,218 A * | 8/2000 | Jennings | G06F 17/5022 703/14 |
| 6,110,318 A * | 8/2000 | Goodman | B29C 35/08 156/272.2 |
| 7,948,254 B2 * | 5/2011 | Olgaard | H04L 1/06 324/756.05 |

(Continued)

FOREIGN PATENT DOCUMENTS

| | | |
|---|---|---|
| CN | 101917306 | 12/2010 |
| CN | 102265664 | 11/2011 |

(Continued)

OTHER PUBLICATIONS

International Search Report and Written Opinion dated Apr. 13, 2015 relative to PCT/US2015/012264, 10 pages.

(Continued)

*Primary Examiner* — Edward Urban
*Assistant Examiner* — Ralph H Justus
(74) *Attorney, Agent, or Firm* — McCracken & Gillen LLC

(57) ABSTRACT

Method for testing multiple signal transceiver devices under test (DUTs), such as data packet signal transceivers, with a shared DUT testing resource, such as a tester having a single vector signal generator (VSG) and a single vector signal analyzer (VSA). Requests by the DUTs for access to tester resources (e.g., to receive signals from the signal generator or provide signals to the signal analyzer) are prioritized based upon tester availability and whether the requesting DUT requires sole access or can share access to the tester. If (Continued)

the tester is unavailable, DUT requests are queued according to their respective priorities to await tester availability. As a result, access to shared tester resources can be managed dynamically to minimize test time while testing multiple DUTs concurrently.

8 Claims, 5 Drawing Sheets

(56) References Cited

U.S. PATENT DOCUMENTS

| | | | |
|---|---|---|---|
| 2010/0304686 A1* | 12/2010 | Kennedy | H04W 24/00 455/67.11 |
| 2013/0006567 A1* | 1/2013 | Horn | G01R 31/31907 702/108 |
| 2013/0193993 A1* | 8/2013 | Golov | G01R 31/319 324/750.01 |
| 2013/0211770 A1 | 8/2013 | Dresler et al. | |
| 2013/0234723 A1 | 9/2013 | Behrens et al. | |
| 2014/0051363 A1* | 2/2014 | Kennedy | H04W 24/00 455/67.11 |
| 2014/0154995 A1* | 6/2014 | Kennedy | H04W 24/06 455/67.11 |
| 2015/0126132 A1* | 5/2015 | Chung | H04B 1/3827 455/67.14 |

FOREIGN PATENT DOCUMENTS

| | | | |
|---|---|---|---|
| CN | 102609352 | 7/2012 | |
| JP | 2972208 | * 9/1999 | G01R 31/26 |
| JP | 2007-271588 A | 10/2007 | |
| KR | 1020100016261 A | 2/2010 | |

OTHER PUBLICATIONS

SIPO First Office Action dated Apr. 3, 2018, for Chinese Patent Application No. 20150004454.9, Applicant LitePoint Corporation (6 pages).

* cited by examiner

METHOD FOR TESTING MULTIPLE WIRELESS DATA PACKET SIGNAL TRANSCEIVERS USING SHARED TESTING RESOURCES

BACKGROUND

The present invention relates to testing of multiple signal transceivers, and in particular, to automated testing of multiple data packet signal transceiver devices under test (DUTs) using shared testing resources.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

As part of the manufacturing of wireless communication devices, one significant component of production cost is costs associated with these manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

Another critical factor in test costs is that of test times, and more particularly per-device test times, which must be minimized without compromising test integrity. Overall test times are determined by actual DUT testing activities (e.g., testing DUT performance in accordance with underlying system and DUT standards), DUT handling activities (e.g., connecting, disconnecting, moving of DUTs), and test preparation activities (e.g., initializing and/or synchronizing DUTs with the test system). Once test times have been optimally reduced for a single device, a next advance in reducing test time and cost involves testing multiple DUTs in a pipeline (e.g., overlapping sequences of distributed testing) or in parallel (e.g., concurrent testing of multiple DUTs) testing. This can include assembling and connecting one or more testers with additional signal routing circuitry (e.g., signal dividers, combiners, switches, multiplexors, etc.) as needed for providing receive (RX) signals to the DUTs and for receiving and analyzing transmit (TX) signals produced by the DUTs.

Where multiple DUTs are tested while sharing tester resources, worst-case estimates of time juxtapositions are typically used when programming the tester to share those resources so as to ensure no contention among the DUTs. Some DUTs will complete test steps sooner than others, in which case they become idle while awaiting programmed access to tester resources. In terms of test time, this is wasted time and increases test time and cost.

Accordingly, it would be desirable to have a dynamic access control where access to tester resources is optimized based on real-time states of the multiple DUTs and the distributed test or parallel-test priorities of the current testing circumstances. Dynamic management of tester resources, where access is determined by an overarching optimization effort, would allow multiple devices to be tested during the same overall time interval and thereby make optimum use of tester resource while reducing time and cost.

SUMMARY

In accordance with the presently claimed invention, a method is provided for testing multiple signal transceiver devices under test (DUTs), such as data packet signal transceivers, with a shared DUT testing resource, such as a tester having a single vector signal generator (VSG) and a single vector signal analyzer (VSA). Requests by the DUTs for access to tester resources (e.g., to receive signals from the signal generator or provide signals to the signal analyzer) are prioritized based upon tester availability and whether the requesting DUT requires sole access or can share access to the tester. If the tester is unavailable, DUT requests are queued according to their respective priorities to await tester availability. As a result, access to shared tester resources can be managed dynamically to minimize test time while testing multiple DUTs concurrently.

In accordance with one embodiment of the presently claimed invention, a method for testing a plurality of signal transceiver devices under test (DUTs) with a shared DUT testing resource includes:
  coupling a shared tester to a plurality of DUTs;
  executing one or more test processes including a plurality of requests for use of the shared tester to communicate with at least a portion of the plurality of DUTs, wherein each one of at least a portion of the plurality of requests has associated therewith a respective tester access priority fir use of the shared tester to communicate with a respective one of the plurality of DUTs;
  when the shared tester is available for use to communicate with one or more of the plurality of DUTs, enabling signal communications between the shared tester and one or more of the plurality of DUTs by
  enabling signal communications between the shared tester and a single one of the plurality of DUTs having associated therewith a request with a tester access priority higher than a request with a tester access priority associated with at least one other DUT, and
  enabling signal communications between the shared tester and multiple ones of the plurality of DUTs having associated therewith respective requests with similar tester access priorities; and when the shared tester is unavailable for use to communicate with one or more of the plurality of DUTs, queuing at least a portion of the plurality of requests in a tester access priority queue.

DETAILED DESCRIPTION

Figure 1:
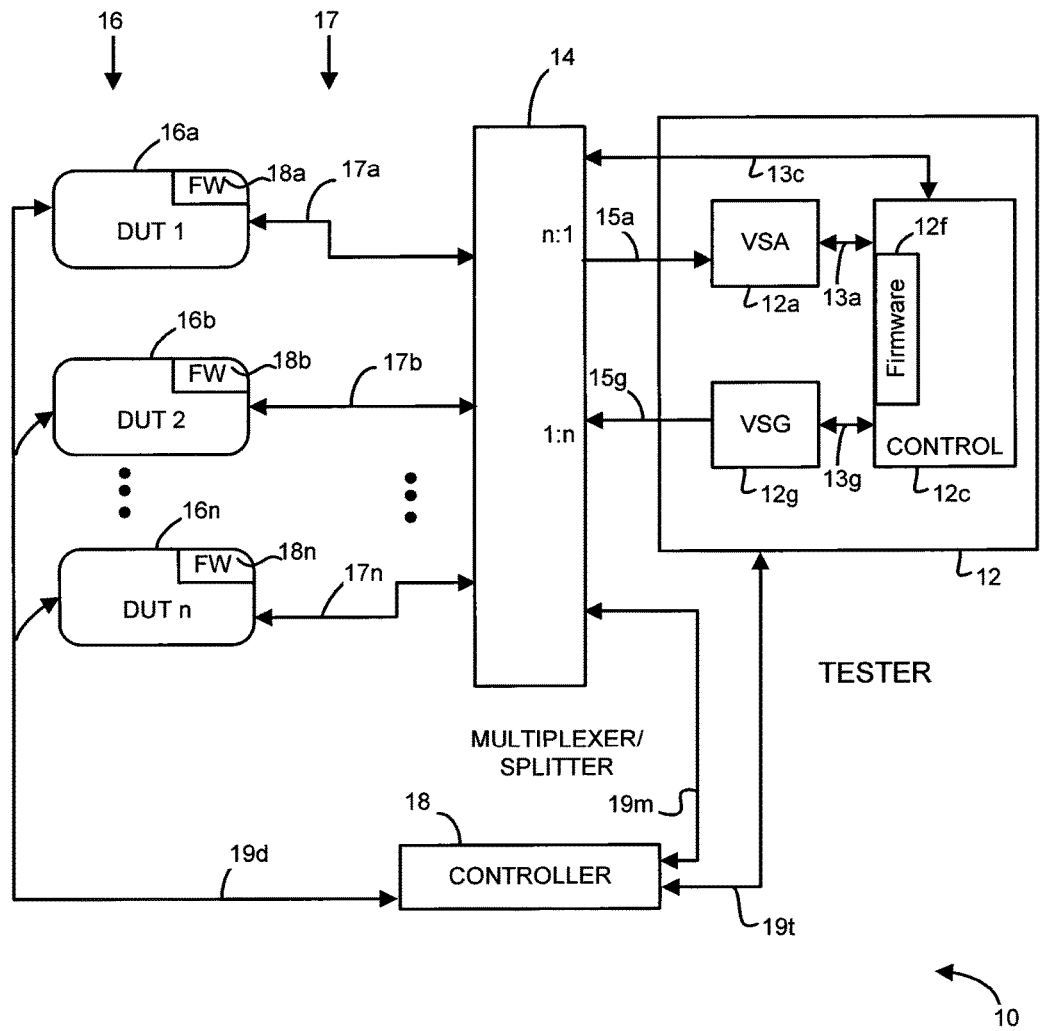
FIG. 1 depicts a block diagram of a testing environment for testing multiple DUTs in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac, 3GPP LTE, and Bluetooth. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

As discussed in more detail below, in accordance with exemplary embodiments of the presently claimed invention, methods are provided for dynamically managing access to shared tester resources by multiple DUTs being tested concurrently. As a result, the testing environment requires tester resources with fewer test wave form generation and signal analysis subsystems than the number of DUTs to be tested, since the tester resources are shared among the multiple DUTs. A prioritized resource-access-token technique can be used in conjunction with a test program such that access requested for testing a DUT is given a queue priority based on its current state of test step completion in view of current distributed or parallel testing optimization priorities. Accordingly, the multiple DUTs need not be aware of respective states of test completion of other DUTs, and the test system need not apply testing resource access on a static, or worst-case-derived, timeline of resource access sequences and timing.

Referring to FIG. 1, in accordance with exemplary embodiments, a testing environment 10 includes a tester 12 for testing multiple DUTs 16, typically under at least some external control from an external controller 18 (e.g., a personal computer). Such a controller 18 communicates (e.g., commands and data) with the tester 12 via a tester control signal interface 19*t*, and with the DUTs 16 via a DUT control signal interface 19*d*. (These control signal interfaces 19*t*, 19*d* can be provided by direct or networked signal connections.) Additionally, signal routing circuitry 14 is provided for providing the capability to multiplex and divide/split the signals between the tester 12 and respective DUTs 16. This signal routing circuitry 14 can also be controlled by the controller 18 via a control signal interface 19*m*.

The tester 12 includes a radio frequency (RF) signal source 12*g* (e.g., a VSG for test data packet signals), a RF signal analyzer 12*a* (e.g., a VSA for receiving and analyzing data packet signals from the DUTs), and a control circuitry 12*c*. The control circuitry 12*c* generally also includes firmware 12*f* in which test processes are programmed for controlling the signal source 12*g* and signal analyzer 12*a* during testing of the DUTs 16. Such control is effected by control signal interfaces 13g, 13a. Additionally, a control signal interface 13c provides control by the control circuitry 12c of the signal routing circuitry 14.

Additional signal connections 15g, 15a in the form of RF signal connections (e.g., conductive signal paths having controlled impedances in accordance with well-known RE signal principles) between the signal source 12g, signal analyzer 12a and signal routing circuitry 14. (In accordance with alternative embodiments, the signal routing circuitry 14 can also be included as part of the tester 12.)

Additional RF signal interfaces 17 are provided to convey signals between the DUTs 16 and signal routing circuitry 14. Each DUT 16a, 16b, . . . 16n can also include firmware 18a, 18b, . . . , 18n for storing programmed commands and data used for initiating and/or controlling test operations of the host DUTs 16a, 16b, . . . 16n.

Figure 2:
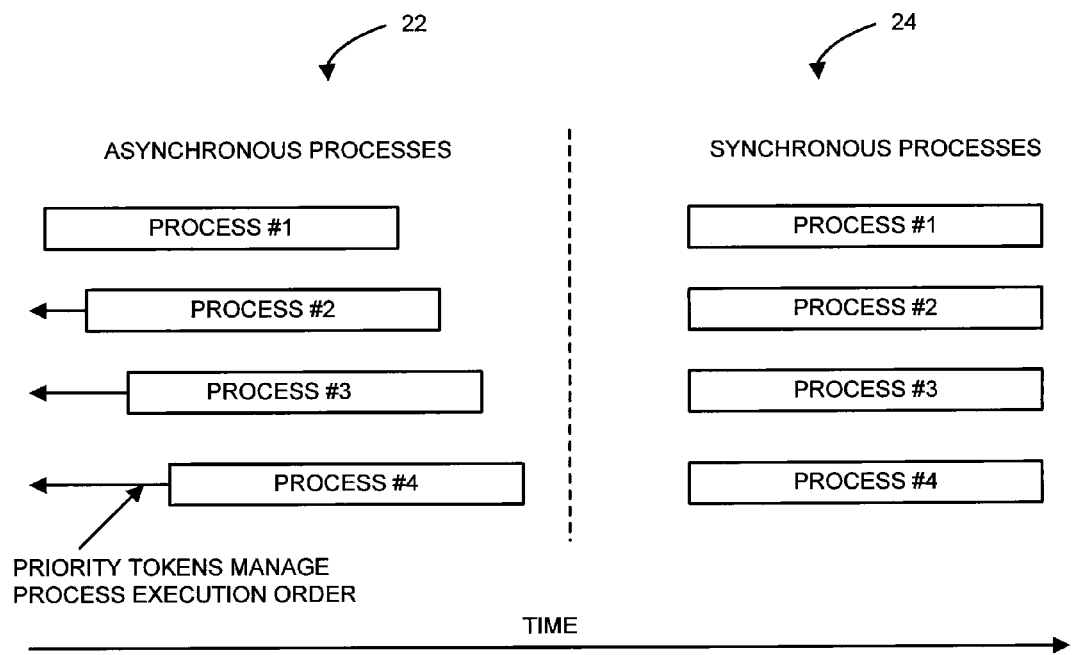
FIG. 2 depicts an exemplary embodiment of a dynamic priority token management technique in which multiple DUTs executing multiple test processes asynchronously can be given priority access to tester resources to enable synchronous parallel testing.

Referring to FIG. 2, testing scenarios for testing multiple DUTs are sometimes optimal when test priority is based on synchronized parallel testing. For example, during testing of the DUT receivers, the tester signal source 12g can be used to send the same test data packet signals to all DUTs 16 in parallel via the routing circuitry 14. To prepare the DUTs 16 for such testing, in accordance with exemplary embodiments, otherwise asynchronous test processes 22 for the respective DUTs 16 are assigned resource access tokens with similar access priorities so as to have the multiple DUTs 16 achieve similar states of test step completions, thereby allowing the DUTs 16 to be tested using synchronized test processes 24. (Generally, each token request priority will be higher or lower than or equal to one or more of the other token request priorities. However, for purposes of the present discussion, "similar" token request priorities are intended to include token request priorities that are equal in every way, e.g., they are requesting access to all of the same tester resources, as well as token request priorities that are at least partially "equal", e.g., they are requesting access to one or more of the same tester resources for at least some interval of time.)

Figure 3:
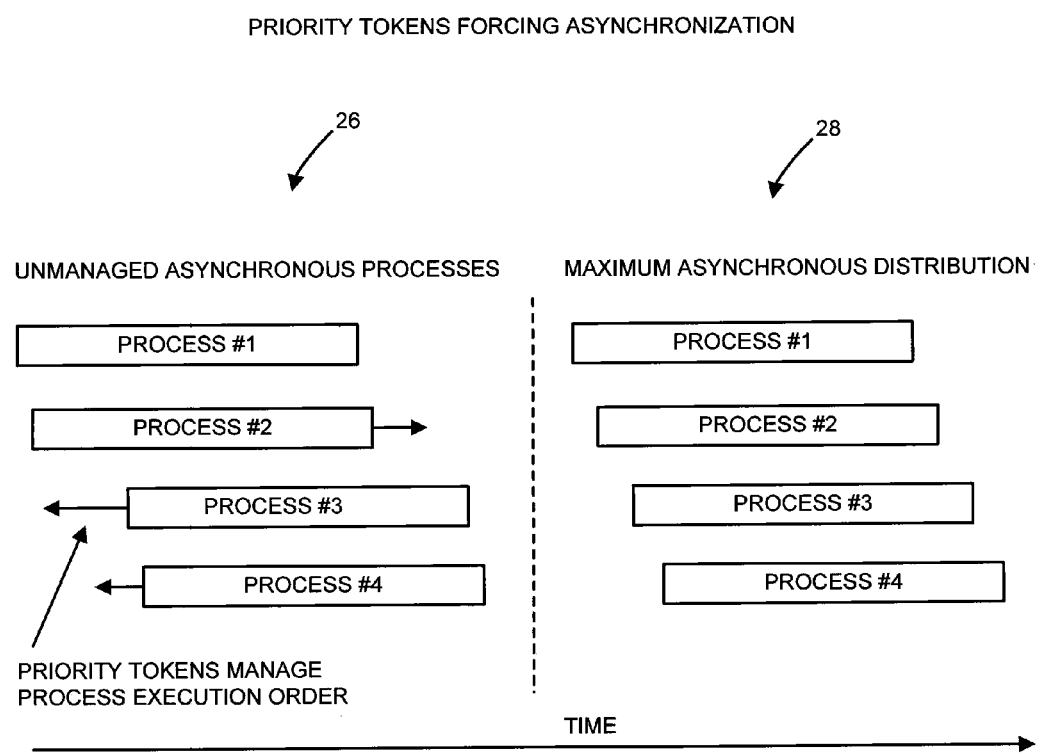
FIG. 3 depicts an exemplary embodiment of a dynamic priority token management technique in which multiple unmanaged DUTs executing test processes asynchronously can be given priority access to tester resources to enable distributed synchronous testing optimized for tester resource use and test time.

Referring to FIG. 3, other testing scenarios may be optimized using distributed (e.g., sequential) testing. For example, when testing the transmitters of the DUTs 16, the DUTs 16 send sequences of test data packet signals to the tester signal analyzer 12a. In the example scenario where the DUTs 16 share one signal analyzer 12a, these test data packet signals cannot be received and analyzed simultaneously, but must be received individually, in sequence. However, some of the test process steps for the respective DUTs 16a, 16b, . . . , 16n often involve time intervals where signal frequencies or power levels are in states of transition, and signals are not being actively transmitted. Accordingly, by pipelining the DUT tests in such a way that the signal transmitting intervals are embedded along with non-transmitting intervals, sequential testing of the transmitted signals can be optimized concurrently with other non-signal test steps being executed by other DUTs. In accordance with exemplary embodiments, multiple DUTs 16 executing otherwise unmanaged asynchronous test processes 26 can be managed to optimize these test processes to achieve maximum asynchronous distribution 28 of such test processes to achieve virtually continuous access and use of test resources and, therefore, minimal test time.

Figure 4:
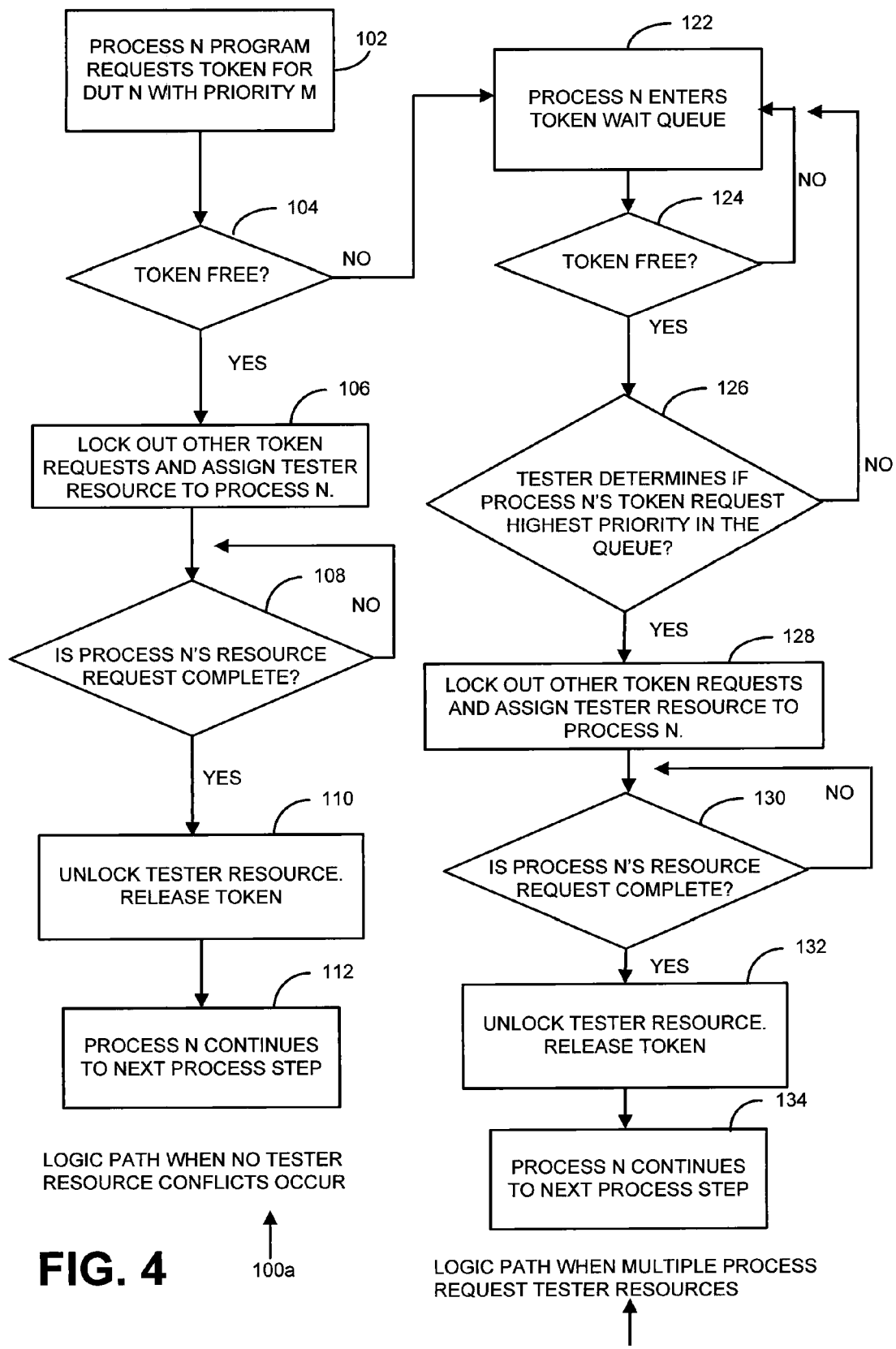
FIG. 4 depicts test flows for exemplary embodiments in which token requests are served by assigning priorities in accordance with requests for tester resources during execution of DUT test processes.

Referring to FIG. 4, in accordance with exemplary embodiments, an algorithm for performing test flows 100, including when no tester resource conflicts occur 100a and when multiple processes compete for tester resources 100b, can be performed as shown. Initially, a test process program requests a token for an associated DUT with a testing priority 102. If a token is available 104, i.e., the resources of the tester 12 are available for testing a DUT, the token is assigned 106 to that DUT, to the exclusion of other DUTs, thereby enabling communications between the assigned DUT and tester. This assignment of the tester 12 to that DUT is maintained so long as the testing process being performed is not yet complete 108. Following completion of that test process, the token is released 110, thereby rendering the tester resources available for use by other DUTs. This process then continues to the next step 112.

However, in the event that the token is not available 104, i.e., the resources of the tester 12 are currently assigned for use with one or more other DUTs, the request for priority is placed into a queue 122. Availability of the token for re-assignment is then monitored 124. When the token subsequently becomes available, it is determined whether the request for tester resources has a priority sufficiently high (e.g., the highest currently in the queue) to warrant its assignment to the DUT associated with such request. If not, the request remains in the queue 122. However, if the request priority is sufficiently high, tester resources are assigned 128 to the associated requesting DUT, and testing of such DUT begins. As before, this assignment of tester resources to the requesting DUT is maintained until the requesting test process is complete 130. Following such test process completion, the token is released, thereby releasing the tester resources for use in testing one or more other DUTs. Following this, the process continues to the next step 134.

Figure 5:
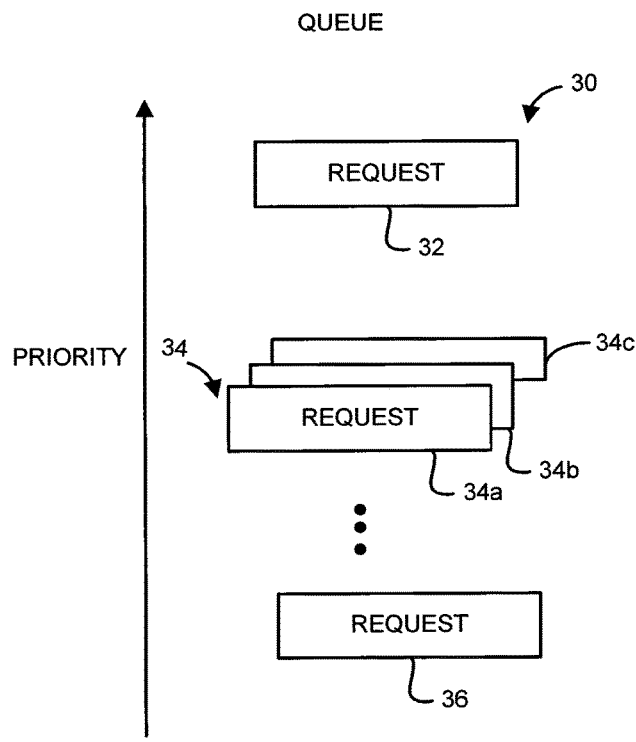
FIG. 5 depicts an exemplary embodiment of a token request queue.

Referring to FIG. 5, as discussed above, a priority queue 30 holds competing requests 32, 34, 36 for tester resources. These requests 32, 34, 36 are maintained within the queue 30 in accordance with their respective priorities. For example, one request 32 may have a priority higher than another request 34a (which, as discussed below, may be one of a group 34 of similar requests), in which case, as tester resources become available, they will be assigned to the request 32 having the higher/highest priority.

Alternatively, there may be multiple requests having similar priority levels. For example, there may be a set of requests 34 in which multiple requests 34a, 34b, 34e have similar priority levels (e.g., for using tester resources to perform parallel testing of DUT receiver circuits). In this case, as tester resources become available, they will be assigned to the set 32 of requests having the higher/highest priority.

Figure 6:
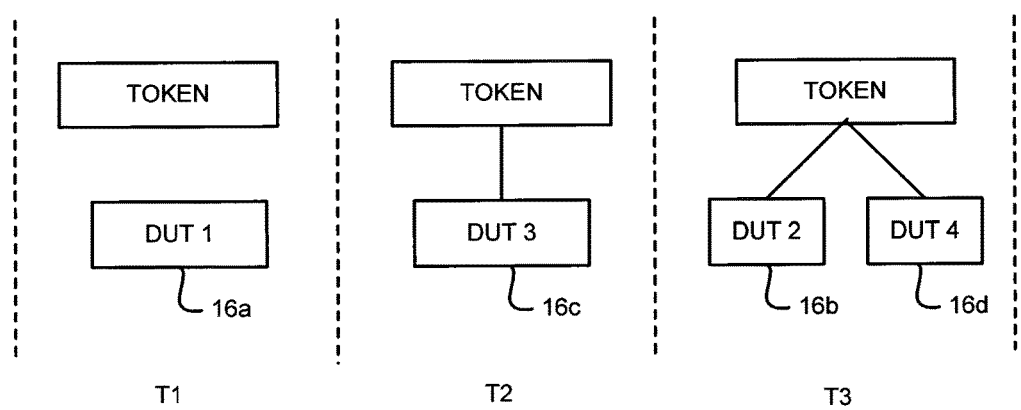
FIG. 6 depicts test time intervals during which different DUT-token assignments are made based on tester access request priorities.

Referring to FIG. 6, in accordance with the foregoing discussion, it will be appreciated that prioritization of requests for access to shared tester resources can result in at least three basic testing scenarios. For example, during one time interval T1, the first DUT 16a may have the highest request priority, and is assigned the tester access token. Subsequently, during time interval T2, another DUT 16c may have the highest request priority, and it is assigned the tester resource access token. Alternatively, during another time interval T3, multiple DUTs 16b, 16d may have similar request priorities (e.g., higher than other DUT requests), and share the tester access token for concurrent use of tester resources.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a plurality of signal transceiver devices under test (DUTs) with a shared DUT testing resource, comprising:
   coupling a shared tester to a plurality of DUTs;
   executing, with each one of said plurality of DUTs, one or more test processes including a request for a token authorizing use of said shared tester to communicate with at least a portion of said plurality of DUTs, wherein said request has associated therewith a respective tester access priority of a respective one of said plurality of DUTs to communicate with said shared tester based on a current state of testing of said respective one of said plurality of DUTs and on one or more testing resources of said tester as requested by said request;
   when said shared tester is available for use to communicate with one or more of said plurality of DUTs, assigning a token to enable signal communications between said shared tester and one or more of said plurality of DUTs by
      assigning an exclusive token to a single one of said plurality of DUTs that presented its request prior to another of said plurality of DUTs or that has associated therewith a request with a tester access priority higher than a request with a tester access priority associated with at least one other DUT, and
      assigning a shared token to multiple ones of said plurality of DUTs that have associated therewith respective requests with similar tester access priorities; and
   when said shared tester is unavailable for use to communicate with one or more of said plurality of DUTs, queuing at least a portion of said plurality of requests in a tester access priority queue.

2. The method of claim 1, wherein said coupling a shared tester to a plurality of DUTs comprises coupling to said plurality of DUTs a tester including a signal generator and a signal analyzer.

3. The method of claim 1, wherein said executing one or more test processes including a request for a token authorizing use of said shared tester to communicate with at least a portion of said plurality of DUTs comprises executing at least a portion of said one or more test processes with said shared tester.

4. The method of claim 1, wherein said assigning an exclusive token to a single one of said plurality of DUTs that presented its request prior to another of said plurality of DUTs or that has associated therewith a request with a tester access priority higher than a request with a tester access priority associated with at least one other DUT comprises receiving, with said shared tester, one or more signals from said single one of said plurality of DUTs.

5. The method of claim 1, wherein said assigning a shared token to multiple ones of said plurality of DUTs having associated therewith respective requests with similar tester access priorities comprises providing, with said shared tester, one or more signals for conveyance to said multiple ones of said plurality of DUTs.

6. The method of claim 1, wherein said executing one or more test processes including a request for a token authorizing use of said shared tester to communicate with at least a portion of said plurality of DUTs further comprises, when said shared tester subsequently becomes available for use to communicate with one or more of said plurality of DUTs, assigning a token to enable signal communications between said shared tester and one or more of said plurality of DUTs by:
   assigning an exclusive token to a single one of said plurality of DUTs that presented its request prior to another of said plurality of DUTs or that has associated therewith a request with a tester access priority higher than another tester access priority in said tester access priority queue; and
   assigning a shared token to multiple ones of said plurality of DUTs having associated therewith respective requests with similar tester access priorities in said tester access priority queue.

7. The method of claim 1, wherein said assigning an exclusive token to a single one of said plurality of DUTs that presented its request prior to another of said plurality of DUTs or that has associated therewith a request with a tester access priority higher than a request with a tester access priority associated with at least one other DUT comprises:
   assigning said exclusive token to said single one of said plurality of DUTs; and
   queuing said request with a tester access priority associated with at least one other DUT in said tester access priority queue.

8. The method of claim 1, wherein said assigning a shared token to multiple ones of said plurality of DUTs having associated therewith respective requests with similar tester access priorities comprises assigning a shared token to said single one of said plurality of DUTs and at least one other DUT having associated therewith a request with a tester access priority in said tester access priority queue.

* * * * *